(12) United States Patent
Saeki

(10) Patent No.: US 7,567,746 B2
(45) Date of Patent: Jul. 28, 2009

(54) DATA PROCESSING DEVICE

(75) Inventor: Shinichi Saeki, Sakai (JP)

(73) Assignee: Panasonic Corporation, Kadoma (JP)

( * ) Notice: Subject to any disclaimer, the term of this patent is extended or adjusted under 35 U.S.C. 154(b) by 880 days.

(21) Appl. No.: 10/548,774

(22) PCT Filed: Feb. 27, 2004

(86) PCT No.: PCT/JP2004/002424

§ 371 (c)(1),
(2), (4) Date: Sep. 8, 2005

(87) PCT Pub. No.: WO2004/084553

PCT Pub. Date: Sep. 30, 2004

(65) Prior Publication Data

US 2006/0168524 A1   Jul. 27, 2006

(30) Foreign Application Priority Data

Mar. 19, 2003   (JP)   ............................. 2003-075669

(51) Int. Cl.
*H04N 5/91* (2006.01)
(52) U.S. Cl. ........................................................ 386/68
(58) Field of Classification Search .................. None
See application file for complete search history.

(56) References Cited

U.S. PATENT DOCUMENTS

| | | | |
|---|---|---|---|
| 5,467,139 A * | 11/1995 | Lankford | 348/512 |
| 5,771,075 A * | 6/1998 | Rim et al. | 348/512 |
| 6,163,646 A | 12/2000 | Tanaka et al. | |
| 6,583,821 B1 * | 6/2003 | Durand | 348/515 |
| 2006/0098742 A1 * | 5/2006 | Meenakshisundaram et al. | 375/240.27 |

(Continued)

FOREIGN PATENT DOCUMENTS

JP   08-168044   6/1996

(Continued)

OTHER PUBLICATIONS

International Search Report for corresponding PCT/JP2004/002424, mailed, Jun. 15, 2004.

*Primary Examiner*—Thai Tran
*Assistant Examiner*—Heather R Jones
(74) *Attorney, Agent, or Firm*—Renner, Otto, Boisselle & Sklar, LLP

(57) ABSTRACT

A data processor includes: a parser receiving a data stream and separating, from the stream, video data including data of pictures, a first time information value showing a presentation time of each picture, audio data including data of frames, and a second time information value showing a presentation time of each frame; an output section for outputting the video and audio data to play back the pictures and frames; a reference register for counting amount of time passed since a predetermined reference time; a first differential register for calculating a difference between the first time information value of each picture and the time passed and holding it as a first differential value when the picture is output; a second differential register for calculating the difference between the second time information value of each frame and the time passed and holding it as a second differential value when the frame is output; and a control section for controlling the output of the video data according to the magnitude of the first differential value to that of the second differential value.

20 Claims, 11 Drawing Sheets

U.S. PATENT DOCUMENTS

2007/0160090 A1 * 7/2007 Sugahara .................... 370/535

FOREIGN PATENT DOCUMENTS

| JP | 09284759 A * | 10/1997 |
| JP | 10-136308 | 5/1998 |
| JP | 2000-236519 | 8/2000 |
| JP | 2001-128171 | 5/2001 |
| JP | 2004-015553 | 1/2004 |

* cited by examiner

DATA PROCESSING DEVICE

TECHNICAL FIELD

The present invention relates to a technique of playing back audio and video by decoding compressed and encoded audio and video data.

BACKGROUND ART

Recently, various methods for cutting down the data sizes of video and audio data, which would take a long time to play back, by compressing and encoding them before writing them on a storage medium have been developed. In International Organization for Standardization (ISO), Moving Picture Image Coding Experts Group (MPEG) of International Electrotechnical Commission (IEC) has been standardizing audio and video coding methods. For example, a video compression method was defined in ISO/IEC 13818-2, an audio compression method was defined in ISO/IEC 13818-3, and a method for synthesizing them was defined in ISO/IEC 13818-1. The last method mentioned is known as the "MPEG System standard". By using these compression coding techniques, a data stream representing video and audio that would take a long time to play back such as a movie (i.e., an MPEG system stream) can now be stored on a single storage medium (e.g., an optical disk) while maintaining its high quality.

Meanwhile, methods for storing those data on a storage medium have been being standardized, too. For instance, a DVD standard called "DVD Specification for Read-Only Disc Version 1.0" is known. Also, the DVD Video Recording standard "DVD Specifications for Rewritable/Re-recordable Discs" was defined in September 1999 as a standard for recording video and audio on a storage medium.

Hereinafter, processing for playing back video and audio synchronously with each other from a data stream on a storage medium will be described. FIG. 1 shows an arrangement of functional blocks in a conventional player 10 that can play back a system stream. In this example, the system stream is supposed to be a program stream with information about system clock reference SCR.

The player 10 includes an AV parser 1, a video decoder 2, an audio decoder 3 and an STC register 4.

The AV parser 1 receives a system stream that has been provided externally and breaks that system stream into audio data and video data. In the following description, a data stream representing audio will be referred to herein as an "audio stream", while a data stream representing video will be referred to herein as a "video stream". Also, the AV parser 1 extracts system clock reference SCR, an audio presentation time stamp APTS and a video presentation time stamp VPTS from the system stream. The AV parser 1 sets a reference value for the STC register 4 based on the system clock reference SCR, and outputs the video stream and VPTS to the video decoder 2 and the audio stream and APTS to the audio decoder 3, respectively. In response, the STC register 4 generates a sync signal STC based on the reference value.

The video decoder 2 decodes the video stream by reference to the sync signal STC and video decoding time stamp VDTS and then outputs the decoded video data at a timing when the sync signal STC matches the VPTS. In the NTSC standard, for example, video presentation time stamps VPTS are added to video at an interval corresponding to about 16.7 ms so as to be synchronized with the times at which field pictures are presented. Also, since 30 video frames are presented per second and one frame consists of two fields according to the NTSC standard, each field is refreshed approximately every 16.7 ms.

On the other hand, the audio decoder 3 decodes the video stream by reference to the sync signal STC and audio decoding time stamp ADTS and then outputs the decoded audio data at a timing when the sync signal STC matches the APTS. For example, audio presentation time stamps APTS are added to audio at an interval corresponding to the audio frame playback timing of about 32 ms.

By performing these processing steps, audio and video can be played back synchronously with each other at the timings that were intended by the maker of the system stream during encoding.

In this example, the sync signal STC is supposed to be generated by reference to the system clock reference SCR. The same reference is used when a digital broadcast is received in real time and clock signals on transmitting and receiving ends need to be synchronized with each other. If the digital broadcast is a transport stream, however, a program clock reference PCR is used.

Meanwhile, in playing back video and audio by reading out a system stream that has already been stored on a storage medium such as an optical disk, it is not always necessary to reproduce the clock signal at the time of encoding by reference to the system clock reference SCR. Alternatively, the sync signal STC may also be set by using the audio presentation time stamps APTS, for example. Thus, an example of such playback will be described with reference to FIG. 2.

FIG. 2 shows an arrangement of functional blocks in another conventional player 20. The player 20 decodes an audio stream and a video stream from a system stream stored on a storage medium, and outputs video synchronously with audio by reference to audio presentation time stamps APTS. Such a player 20 is disclosed in Japanese Patent Application Laid-Open Publication No. 10-136308, for example.

An AV separating section 12 reads a digitally encoded system stream from a data storage device 11 and separates audio and video data that are stored there after having been multiplexed.

A video processing section 13 decodes the video data and sends video header information, obtained during the decoding process, to a delay detecting section 16. The video presentation time stamps VPTS are described in the header information. Also, the video processing section 13 saves the total number of frames of the video data that has ever been, played back since the start of the playback on a video frame counter 18. An audio processing section 14 decodes audio data and sends audio header information, obtained during the decoding process, to a clock generating section 17. The audio presentation time stamps VPTS are described in the header information. Also, the audio processing section 14 saves the total amount of the audio data that has ever been played back since the start of the playback on an audio data counter 19.

The clock generating section 17 calculates a reference time, which is shown as audio playback duration, based on the total amount of data saved in the audio data counter 19 and the audio header information obtained from the audio processing section 14. The delay detecting section 16 calculates the ideal number of frames of the video data that should be output in accordance with the information about the reference time obtained from the clock generating section 17 and the video header information received from the video processing section 13. Also, the delay detecting section 16 compares the ideal number of frames with the actual number of frames obtained by the video frame counter, thereby sensing how the video playback is coming along with the audio playback.

If the delay detecting section 16 has sensed that the video output is behind the audio output, then a frame skipping control section 15 determines frames not to output (i.e., frames to skip) and provides the AV separating section 12 and the video processing section 13 with that information. The video processing section 13 omits the output of those frames to skip but outputs their succeeding frames. As a result, the video delay can be cut down by an amount of time corresponding to the playback duration of one frame (e.g., 33 ms in NTSC) and the video output is no longer trailing behind the audio output. The player 20 can play back audio and video synchronously with each other by such a technique.

The video playback is defined with respect to the audio playback as follows. Suppose the "ideal state" is a state in which video and audio are played back at the timings that were originally intended by the maker during encoding. Generally speaking, if the video is played back within a time frame of −50 ms and 30 ms from the ideal state (i.e., with respect to the audio playback), then a person senses that the audio and video are synchronous with each other. Accordingly, if the video presentation time falls within this permissible range with respect to the audio presentation time, then the video output may be judged as not trailing behind the audio output. Otherwise, the video output may be judged as trailing behind the audio output.

However, if the conventional player played back the video by reference to the audio playback duration, then the following problems would arise.

Specifically, in determining whether or not audio and video are being played back synchronously with each other, the conventional player might judge that the audio and video time lag has exceeded its permissible range, even though the time lag actually falls within the permissible range.

For example, suppose the video is being played back 20 ms behind (which delay falls within the permissible range) the audio. As described above, the APTS is added to an audio frame approximately every 32 ms and the VPTS is added to a video field approximately every 16.7 ms. That is why according to a timing at which the VPTS is compared with the APTS, the video might be played back at most 52 ms behind or ahead of the audio. Particularly if the VPTS and APTS should be compared with each other only just after the VPTS has been updated, then the video would be played back +20 ms to +52 ms later than the audio. Thus, if the lag falls within the range of +30 ms to +52 ms, then the viewer would feel uncomfortable to see the video and audio played back non-synchronously.

Also, if the audio playback ended earlier than the video playback, then the conventional player could no longer continue the video playback after that. This is because once the audio playback has ended, the audio playback duration is not counted anymore and the audio can no longer function as a time reference for playing back the video. In a system stream, in particular, audio data and video data are included as a mixture, and the presentation time of the audio data does not always match that of the video data. Accordingly, the audio data and video data obtained at the end of the data reading operation will finish being played back at mutually different times. And the audio playback may end earlier than the video playback, thus causing various inconveniences.

Thus, an object of the present invention is to synchronize audio and video with each other just as intended when the video is played back by reference to the audio presentation time. Another object of the present invention is to play back the video continuously even if the audio playback has ended earlier than the video playback.

DISCLOSURE OF INVENTION

A data processor according to the present invention includes: a parser, which receives a data stream and which separates, from the data stream, video data including data of a plurality of pictures, a first time information value showing a presentation time of each of those pictures, audio data including data of a plurality of audio frames, and a second time information value showing a presentation time of each of those audio frames; an output section for outputting the video data and the audio data to play back the pictures and the audio frames; a reference register for counting amount of time that has passed since a predetermined reference time; a first differential register for calculating a difference between the first time information value of each said picture and the amount of time passed and holding the difference as a first differential value when the picture is output; a second differential register for calculating a difference between the second time information value of each said audio frame and the amount of time passed and holding the difference as a second differential value when the audio frame is output; and a control section for controlling output of the video data according to the magnitude of the first differential value with respect to that of the second differential value.

The reference register may count the amount of time passed by setting a time when the audio data starts to be output as the predetermined reference time.

When finding the second differential value greater than a sum of the first differential value and a first prescribed value, the control section may instruct the output section to output the video data of the picture being output at that point in time again.

When finding the second differential value smaller than the difference between the first differential value and a second prescribed value, the control section may instruct the output section to skip output of the video data of the picture.

On receiving an instruction to set a pause on playback, the control section may control the output of the video data by reference to the first and second time information values.

On receiving an instruction to cancel the pause on playback, the control section may instruct the output section to output the audio data earlier than the video data if the second time information value is greater than a sum of the first time information value and a third prescribed value.

On receiving an instruction to cancel the pause on playback, the control section may instruct the output section to output the video data earlier than the audio data if the second time information value is smaller than the difference between the first time information value and a fourth prescribed value.

On receiving an instruction to cancel the pause on playback, the control section may instruct the output section to output the video data and the audio data simultaneously.

A data processing method according to the present invention includes the steps of: receiving a data stream; separating, from the data stream, video data including data of a plurality of pictures, a first time information value showing a presentation time of each of those pictures, audio data including data of a plurality of audio frames, and a second time information value showing a presentation time of each of those audio frames; outputting the video data and the audio data to play back the pictures and the audio frames; counting amount of time that has passed since a predetermined reference time; calculating a difference between the first time information value of each said picture and the amount of time passed and holding the difference as a first differential value when the picture is output; calculating a difference between the second time information value of each said audio frame and the amount of time passed and holding the difference as a second differential value when the audio frame is output; and controlling output of the video data according to the magnitude of the first differential value with respect to that of the second differential value.

The step of counting may include counting the amount of time passed by setting a time when the audio data starts to be output as the predetermined reference time.

If the second differential value is greater than a sum of the first differential value and a first prescribed value, the step of outputting may include outputting the video data of the picture being output at that point in time again.

If the second differential value found smaller than the difference between the first differential value and a second prescribed value, the step of outputting may include skipping output of the video data of the picture.

The data processing method may further include the step of receiving an instruction about a pause on playback, and the step of outputting may include controlling the output of the video data by reference to the first and second time information values in accordance with the instruction.

The data processing method may further include the step of receiving an instruction about a pause on playback, and the step of outputting may include outputting the audio data earlier than the video data in accordance with the instruction if the second time information value is greater than a sum of the first time information value and a third prescribed value.

The data processing method may further include the step of receiving an instruction about a pause on playback, and the step of outputting may include outputting the video data earlier than the audio data in accordance with the instruction if the second time information value is smaller than the difference between the first time information value and a fourth prescribed value.

The data processing method may further include the step of receiving an instruction about a pause on playback, and the step of outputting may include outputting the video data and the audio data simultaneously in accordance with the instruction.

A data processing program according to the present invention is executable by a computer. Following this program, a data processor with a built in computer carries out the processing steps of: receiving a data stream; separating, from the data stream, video data including data of a plurality of pictures, a first time information value showing a presentation time of each of those pictures, audio data including data of a plurality of audio frames, and a second time information value showing a presentation time of each of those audio frames; outputting the video data and the audio data to play back the pictures and the audio frames; counting amount of time that has passed since a predetermined reference time; calculating a difference between the first time information value of each said picture and the amount of time passed and holding the difference as a first differential value when the picture is output; calculating a difference between the second time information value of each said audio frame and the amount of time passed and holding the difference as a second differential value when the audio frame is output; and controlling output of the video data according to the magnitude of the first differential value with respect to that of the second differential value.

BEST MODE FOR CARRYING OUT THE INVENTION

In the following description, the data structure of a data stream will be described first, and then a data processor according to a preferred embodiment for processing that data stream will be described.

Figure 3:
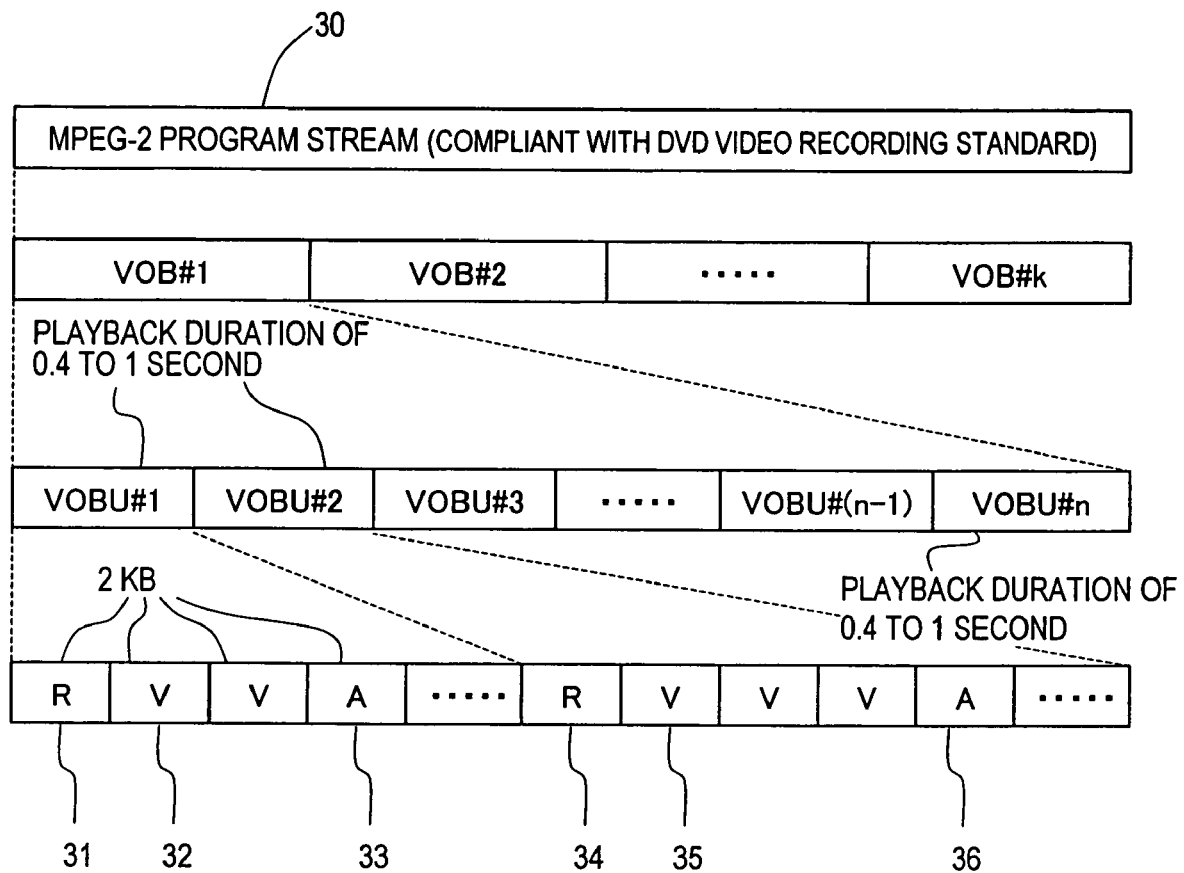
FIG. 3 shows a data structure for an MPEG2 program stream 30 compliant with the DVD Video Recording standard.

FIG. 3 shows a data structure for an MPEG2 program stream 30 compliant with the DVD Video Recording standard (which will be simply referred to herein as a "data stream 30").

The data stream 30 includes a plurality of video objects (VOBs) #1, #2, . . . , and #k. Supposing the data stream 30 is a content that was shot with a camcorder, for example, each VOB stores moving picture data that was generated during a single video recording session (i.e., since the user started recording the video and until he or she stopped doing it).

Each VOB includes a plurality of VOB units (video object units; VOBUs) #1, #2, . . . , and #n. Each VOBU is a data unit containing video data in an amount corresponding to a video playback duration of 0.4 second to 1 second.

Hereinafter, the data structure of VOBUs will be described with the first and second VOBUs #1 and #2 in FIG. 3 taken as an example.

Figure 1:
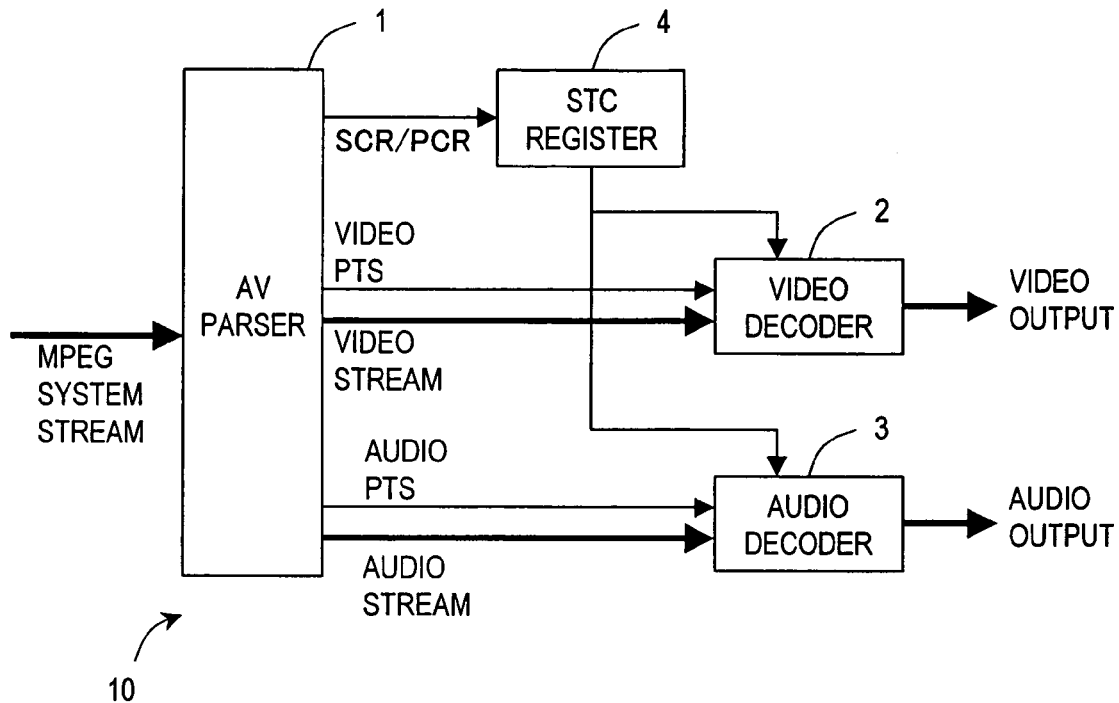
FIG. 1 shows an arrangement of functional blocks in a conventional player 10 that can play a system stream.
Figure 2:
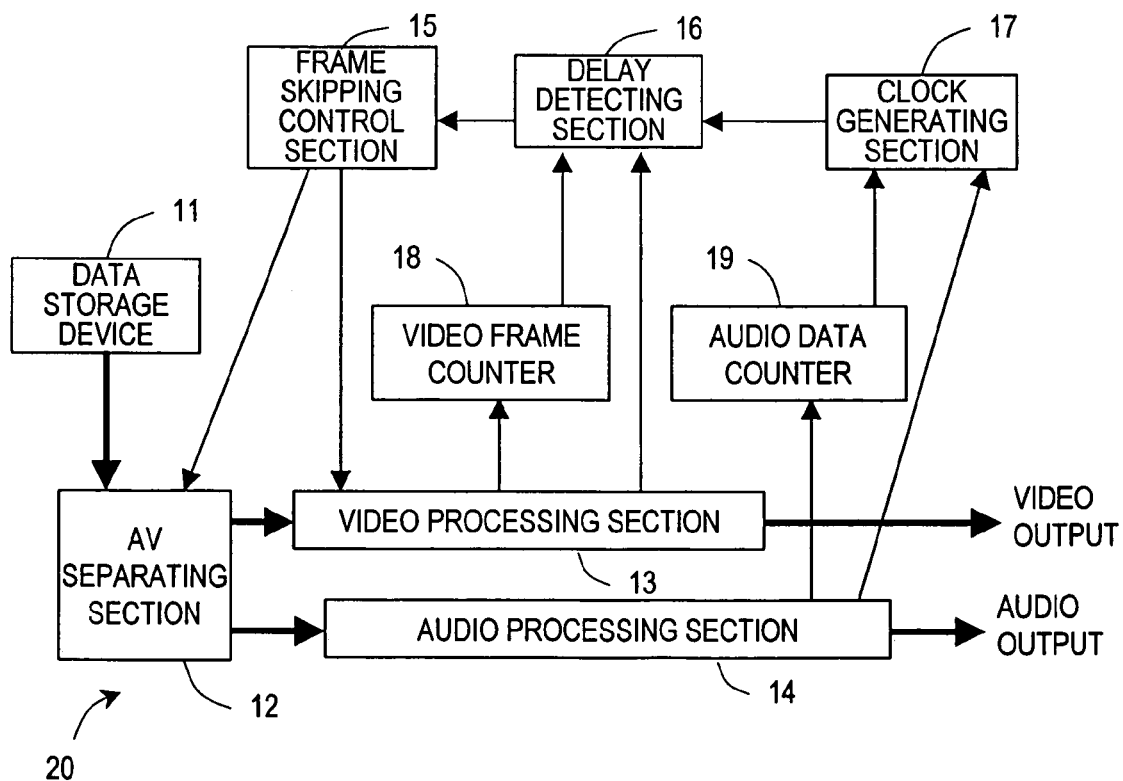
FIG. 2 shows an arrangement of functional blocks in another conventional player 20.

VOBU #1 is composed of a number of packs, which belong to the lowest-order layer of the MPEG program stream. In the data stream 30, each pack has a fixed data length (also called a "pack length") of 2 kilobytes (i.e., 2,048 bytes). At the top of the VOBU, a real time information pack (RDI pack) 11 is positioned as indicated by "R" in FIG. 1. The RDI pack 31 is followed by multiple video packs "V" (including a video pack 32) and multiple audio packs "A" (including an audio pack 33). It should be noted that if the video data has a variable bit rate, the data size of each VOBU is changeable within a range defined by a maximum read/write rate even if the playback duration is the same. However, if the video data has a fixed bit rate, the data size of each VOBU is substantially constant.

Each pack stores the following information. Specifically, the RDI pack 31 stores various information for controlling the playback of the data stream 30, e.g., information representing the playback timing of the VOBU and information for controlling copying of the data stream 30. The video packs 32 store MPEG2-compressed video data thereon. The audio packs 33 store audio data that was compressed so as to comply with the MPEG2 Audio standard, for example.

VOBU #2 is also made up of a plurality of packs. An RDI pack 34 is located at the top of VOBU #2, and then followed by a plurality of video packs 35 and a plurality of audio packs 36. The contents of the information to be stored in these packs are similar to those of VOBU #1.

Video and audio are decoded and played back on a so-called "access unit" basis. The access unit is one video frame for video and one audio frame for audio. According to the MPEG System standard, time stamps for specifying the time to decode and the time to play back are added to each access unit. That is to say, there are two time stamps including a decoding time stamp (DTS) showing when to decode and a presentation time stamp (PTS) showing when to play back.

Generally speaking, a player that can play a system stream compliant with the MPEG System standard, including the data stream 30, generates a sync signal STC (system time clock) internally, which will be used as a reference to synchronize the operation of a decoder. If the system stream is a program stream, the sync signal STC is generated by reference to the value of the system clock reference SCR added to the stream. On the other hand, if the system stream is a transport stream, the sync signal STC is generated by reference to the value of the program clock reference PCR added to the stream.

When the time shown by the sync signal STC agrees with the decoding time information DTS, the decoder of the player decodes an access unit to which that DTS is added. Thereafter, when the time shown by the sync signal STC agrees with the presentation time information PTS, the decoder outputs an access unit to which that PTS is added. As a result, video and audio are played back synchronously with each other at the timing intended by the designer of the data stream 30.

Figure 4:
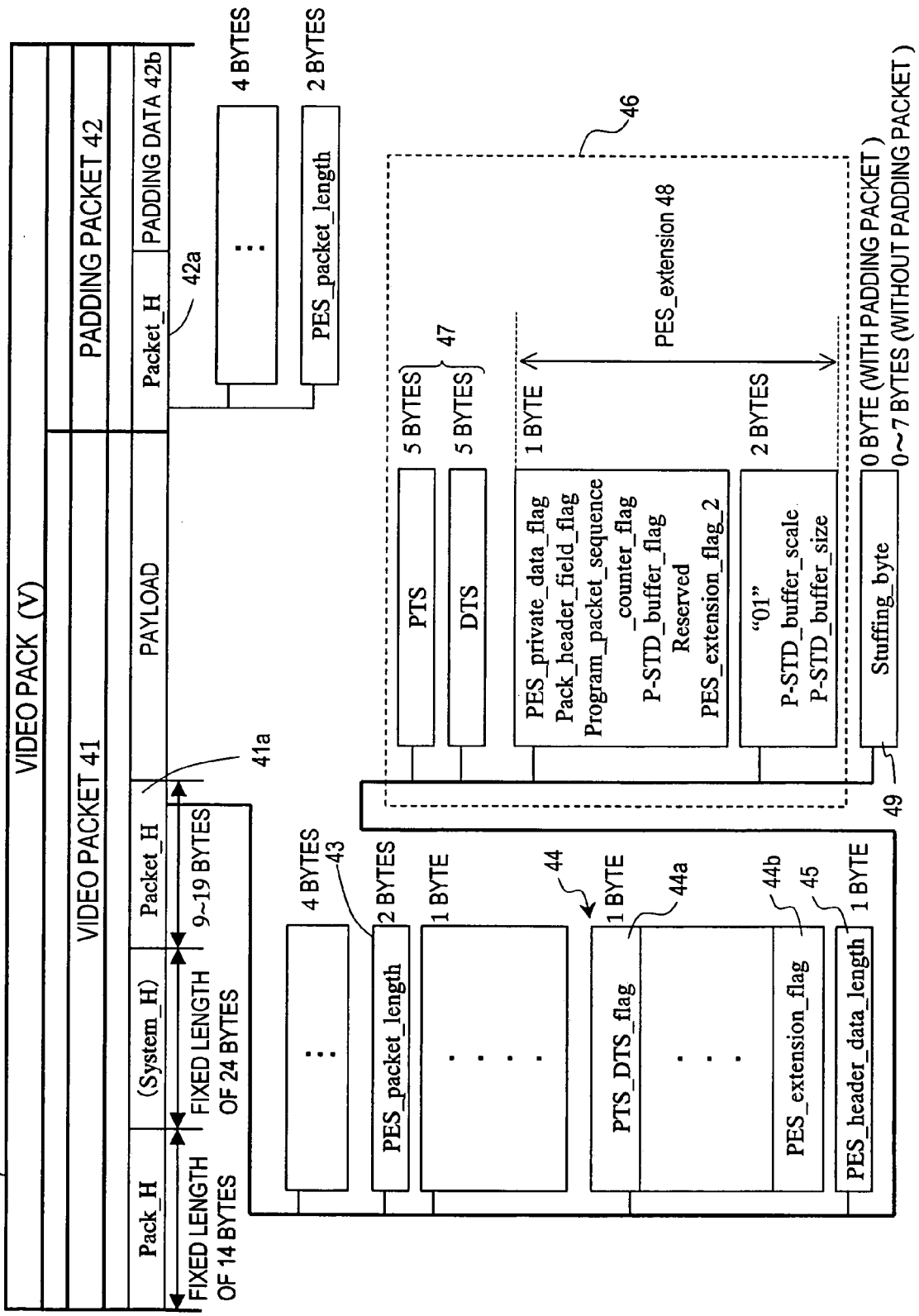
FIG. 4 shows the data structure of a video pack 32.

Next, the data structure of a video pack will be described. FIG. 4 shows the data structure of the video pack 32. The video pack 32 includes a video packet 41 and a padding packet 42. The padding packet 42 is provided to adjust the pack length of a data pack. Thus, no padding packets are provided if there is no need to adjust the pack length. In that case, only the video packet 41 will be included in the video pack 32.

The video packet 41 includes a pack header (Pack_H) of 14 bytes, a system header (system_H) of 24 bytes, a packet header (Packet_H) 41a and a payload, which are arranged in this order from the top. In the pack header, information showing the type of the pack (i.e., a video packet in this case) is described. The system header is always added to the first pack of each VOBU. The packet header 41a will be described in detail later. And in the payload, compressed and encoded video data is described.

Meanwhile, the padding packet 42 includes a packet header (Packet_H) 42a and padding data 42b. In the packet header 42a, not only information showing the identity as a padding packet but also the data length (byte length) of the padding packet 42a are described. The data length is described in the field of fifth and sixth bytes (PES_packet_length). A predetermined value is stored as the padding data 42b. This value may be a series of meaningless values "0xFF (hexadecimal number)". The amount of the padding data 42b included is determined so as to adjust the pack length of the video pack 32 to 2,048 bytes as described above.

Next, the data structure of the packet header 41a of the video packet 41 will be described. The packet header 41a includes a packet length field 43, a flag field 44 and a header data length field 45. Depending on the values of a time flag field 44a and a PES extension flag field 44b, the packet header 41a may further include an additional field 46.

In the packet length field 43, a packet length (byte length) as measured from that field through the end of the video packet 41 is described. Accordingly, if there is any padding packet 42, the video packet 41 has a shorter packet length and a smaller packet length value is described in the packet length field 43. The next flag field 44 includes a time flag field (PTS_DTS_flag) 44a and a PES extension flag field (PES_extension_flag) 44b. In the time flag field 44a, a flag showing whether or not there are a presentation time stamp (PTS) and a decoding time stamp (DTS) is described as will be mentioned later. In the PES extension flag field 44b, a flag showing whether or not there is a PES extension field is described as will be mentioned later. And in the header data length field 45, the sum of the field lengths of the additional field 46 and a stuffing byte field 49 is stored.

Next, the additional field 46 will be described. For example, if the time flag field 44a shows that there are both PTS and DTS, one of PTS and DTS fields 47, each having a length of 5 bytes, is provided as the additional field 46. The PTS is information about the presentation time of video data, while the DTS is information about the decoding time. Depending on the value of the time flag field 44a, one of these two fields is provided.

Also, a PES extension field 48 may be provided as the additional field 46. In the PES extension field 48, information required for decoding the program stream 30, e.g., the capacity of a decoding data buffer, is described.

In the data stream 30, the PES extension field 48 is provided for the first video pack and the first audio pack in each VOBU. The PES extension field 48 may be present if the PES extension flag field 44b is one but absent if the PES extension flag field 44b is zero, for example.

The packet header 41a sometimes includes a stuffing byte field 49. In the stuffing byte field 49, stuffing bytes are stored to adjust the pack length. The stuffing bytes are byte data such as meaningless "0xFF" (hexadecimal number). The stuffing byte field 49 and padding packet 42 are provided for the same purpose of adjusting the pack length. Accordingly, conditions that the stuffing bytes are no greater than 7 bytes and that the stuffing bytes 49 and the padding packet 42 cannot be provided in the same pack are defined according to the DVD Video standard. In the example illustrated in FIG. 4, since the padding packet 42 is included in the video pack 32, the length of the stuffing byte field 49 is zero bytes. That is to say, no stuffing byte fields are provided.

The data structure of the video pack is shown in FIG. 4. The audio pack may have a similar data structure. Thus, the same statement applies to the audio pack just by replacing the "video packet" with an "audio packet" and the "video data" stored in the payload with "audio data". Accordingly, in the packet header 41a of the audio packet, a PTS/DTS field 47 is included in the additional field 46 to describe a PTS or a DTS showing its presentation (or output) time. The audio presentation time stamp (PTS) will be abbreviated herein as "APTS", while the video presentation time stamp (PTS) will be abbreviated herein as "VPTS".

Figure 5:
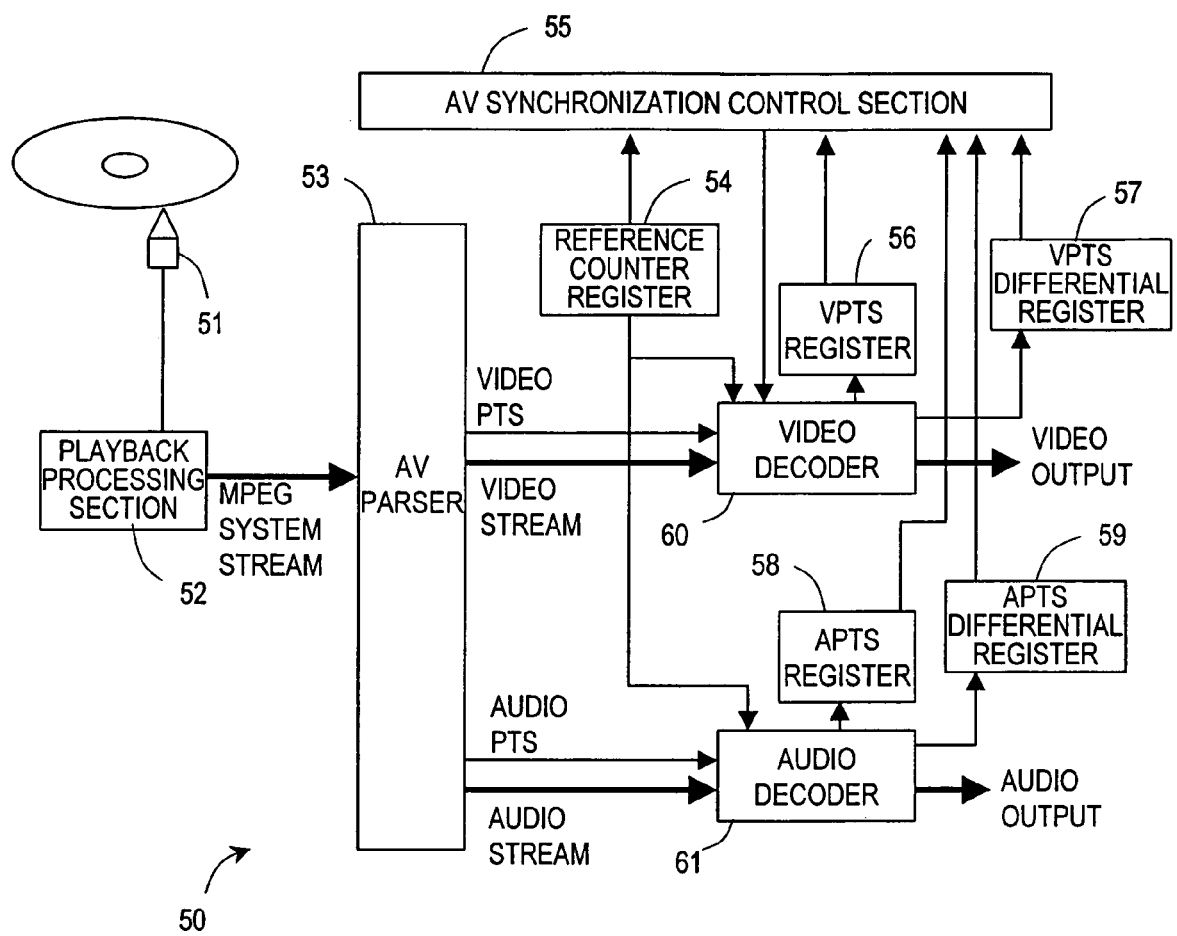
FIG. 5 shows an arrangement of functional blocks in a data processor 50 according to a preferred embodiment of the present invention.

Hereinafter, a data processor will be described with reference to FIG. 5, which shows an arrangement of functional blocks in a data processor 50 according to this preferred embodiment. In this preferred embodiment, the data processor 50 manages the output timing of a video frame by reference to the presentation time of an audio frame. Thus, this preferred embodiment is different from the processing done by the player 10 shown in FIG. 1 in which the STC register 4 manages both the video and audio outputs alike. It should be noted that the time when the video and audio frame data are output is supposed herein to be identical with the time when those frames are played back as video and output as audio.

In a nutshell, the data processor 50 operates as follows. First, the data processor 50 reads a data stream 30 from a storage medium, and separates compressed and encoded video data including the data of a plurality of pictures, the VPTS of those pictures, audio data including the data of a plurality of frames, and the APTS of those frames from the data stream 30. Then, the data processor 50 decodes the video data and the audio data to play back those pictures and frames.

In parallel with this processing, the data processor 50 counts the amount of time that has passed since a reference time (e.g., the playback start time of audio). In outputting each picture, the data processor 50 calculates a differential value between the VPTS of that picture and the amount of time passed. In outputting each audio frame on the other hand, the data processor 50 calculates a differential value between the APTS of that audio frame and the amount of time passed. And the data processor 50 controls the playback and output of the video data according to the magnitudes of the video and audio differential values. For example, if the video differential value is greater than the audio differential value by a predetermined quantity or more, then the data processor 50 skips the output of a single picture. It should be noted that the "picture" is herein a notion representing both a frame and a field alike.

Hereinafter, respective components of the data processor 50 will be described before it is described how the data processor 50 operates.

The data processor 50 includes an optical pickup 51, a playback processing section 52, an AV parser 53, a reference counter register 54, an AV synchronization control section 55, a VPTS register 56, a VPTS differential register 57, an APTS register 58, an APTS differential register 59, a video decoder 60 and an audio decoder 61.

The optical pickup 51 reads a data stream 30 from a storage medium, which may be an optical disk such as a DVD or a Blu-ray Disc (BD), for example. The playback processing section 52 converts the data stream 30, obtained as an analog signal, into digital data and then outputs it.

The AV parser 53 breaks the data stream 30 into a video stream and an audio stream. Also, the AV parser 53 extracts not only an SCR from the system stream but also video presentation time stamps VPTS from the video packs 32, 35, etc. of the data stream 30 and audio presentation time stamps APTS from the audio packs 33, 36, etc, respectively.

The video decoder 60 decodes the video stream, thereby generating video data. More specifically, when the value shown by the time stamp DTS and the reference counter value shown by the reference counter register 54 either agree with each other or have a predetermined difference, the video decoder 60 decodes the picture data to which the DTS is added. And when the VPTS value and the reference counter value either agree with each other or have a predetermined difference, the video decoder 60 outputs picture data to which that PTS is added. Also, on receiving an instruction to skip the output of a frame, the video decoder 60 skips the output of that frame and resumes outputting the following frames and on.

The audio decoder 61 decodes the audio stream, thereby generating audio data. And the audio decoder 61 decodes the audio frame data and outputs the audio data.

The reference counter register 54 counts the amount of time passed by reference to the audio data output timing, in other words, as fast as the time passing since the playback reference time. The amount of time passed is supposed to be represented at a precision of 90 kHz, for example. With this precision, the reference time can be updated at a sufficiently shorter interval than a video frame or an audio frame.

The VPTS register 56 holds VPTS representing video presentation time stamps. The VPTS differential register 57 holds the differential value between the VPTS value retained in the VPTS register 56 and the value of the reference counter register 54 (i.e., a VPTS differential value). The APTS register 58 holds APTS representing audio presentation time stamps. The APTS differential register 59 holds the differential value between the APTS value retained in the APTS register 58 and the value of the reference counter register 54 (i.e., an APTS differential value). Once received a certain value, each of the VPTS register 56, VPTS differential register 57, APTS register 58 and APTS differential register 59 keeps holding that value until the next value is input.

The AV synchronization control section 55 compares the values of the VPTS differential register 57 and APTS differential register 58 with each other, and controls the video decoder 60 so as to adjust the video data played and output. In this manner, the video is synchronized with the audio.

Figure 6:
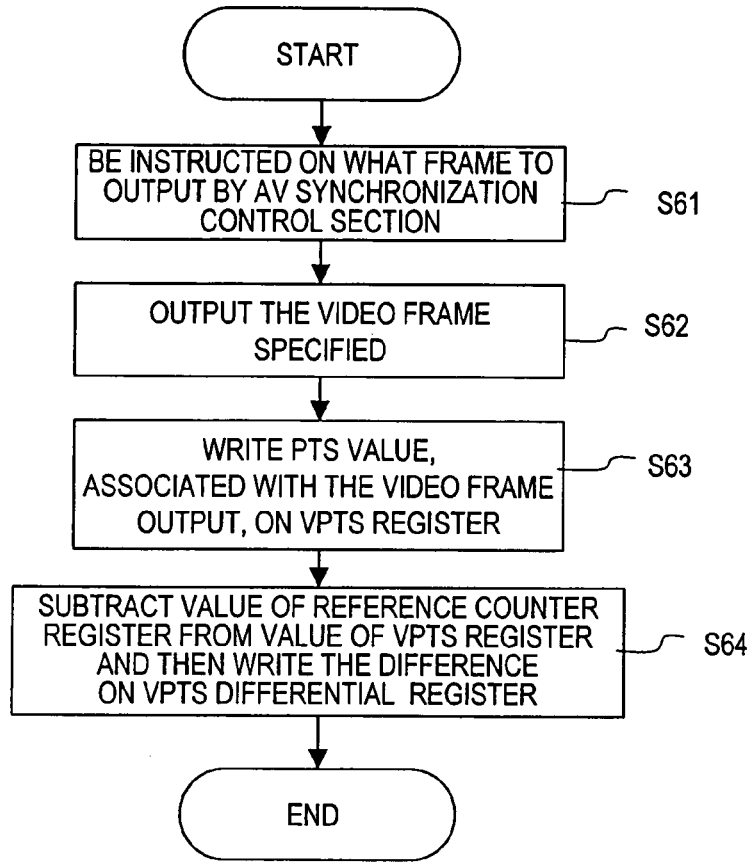
FIG. 6 is a flowchart showing the procedure of processing done by the video decoder.

Hereinafter, it will be described more fully how the video decoder 60 and the audio decoder 61 operate. FIG. 6 shows the procedure of processing done by the video decoder. On receiving an instruction on what video frame to output from the AV synchronization control section 55 in Step S61, the video decoder 60 decodes and outputs that frame in Step S62. Next, in Step S63, the video decoder 60 writes a VPTS value, associated with the video frame output, onto the VPTS register 56. Thereafter, in Step S64, the video decoder 60 subtracts the counter value, stored in the reference counter register 54 at that point in time, from the value held in the VPTS register 56 and then writes the resultant VPTS differential value onto the VPTS differential register 57. By performing these processing steps, the video decoder 60 updates the values retained in the VPTS register 56 and in the VPTS differential register 57.

Optionally, those values may be written on the VPTS register 56 and VPTS differential register 57 before the video is output. Also, the values of the VPTS register 56 and the VPTS differential register 57 may be updated with the VPTS value of the next frame while the video is being output.

Figure 7:
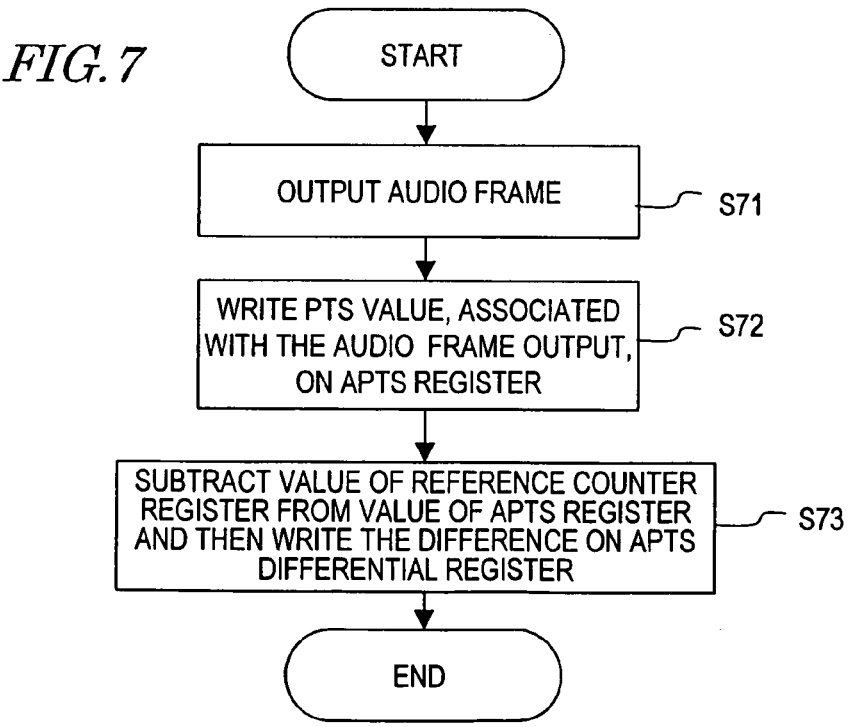
FIG. 7 is a flowchart showing the procedure of processing done by the audio decoder 61.

Meanwhile, FIG. 7 shows the procedure of processing done by the audio decoder 61. First, in Step S71, the audio decoder 61 decodes and outputs an audio stream. Next, in Step S72, the audio decoder 61 writes an APTS value, associated with the audio frame output, onto the APTS register. Thereafter, in Step S73, the audio decoder 61 subtracts the counter value, stored in the reference counter register 54 at that point in time, from the value held in the APTS register 58 and then writes the resultant APTS differential value onto the APTS differential register 59.

Optionally, those values may be written on the APTS register 58 and APTS differential register 59 before the audio is output. Also, the values of the APTS register 58 and the APTS differential register 59 may be updated with the APTS value of the next audio frame (in 32 ms) while the audio is being output.

Figure 8:
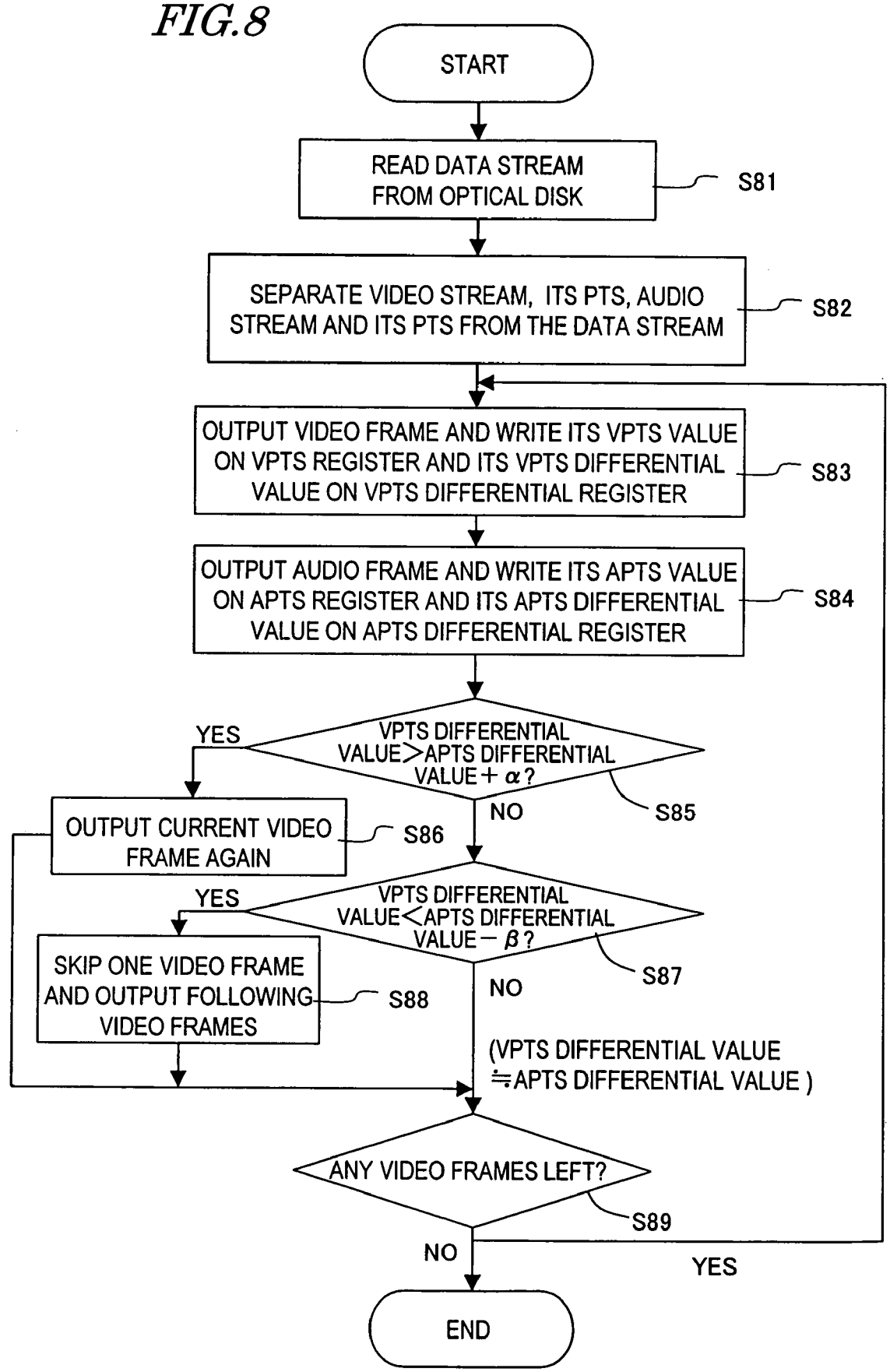
FIG. 8 is a flowchart showing the procedure of processing done by the data processor 50.

Hereinafter, the processing done by the data processor 50 will be described. FIG. 8 shows the procedure of the processing done by the data processor 50. First, in Step S81, the optical pickup 51 reads a data stream from an optical disk and the playback processing section 52 performs digitization processing. Next, in Step S82, the AV parser 53 separates a video stream, VPTS, an audio stream and APTS from the data stream 30 that has been read.

In Step S83, the video decoder 60 outputs a video frame and writes its VPTS value on the VPTS register 56 and its VPTS differential value onto the VPTS differential register 57, respectively. Next, in Step S84, the audio decoder 61 outputs an audio frame and writes its APTS value on the APTS register 58 and its APTS differential value onto the APTS differential register 59, respectively.

Subsequently, in Step S85, the AV synchronization control section 55 compares the VPTS differential value retained in the VPTS differential register 57 with the APTS differential value retained in the APTS differential register 59.

Figure 9:
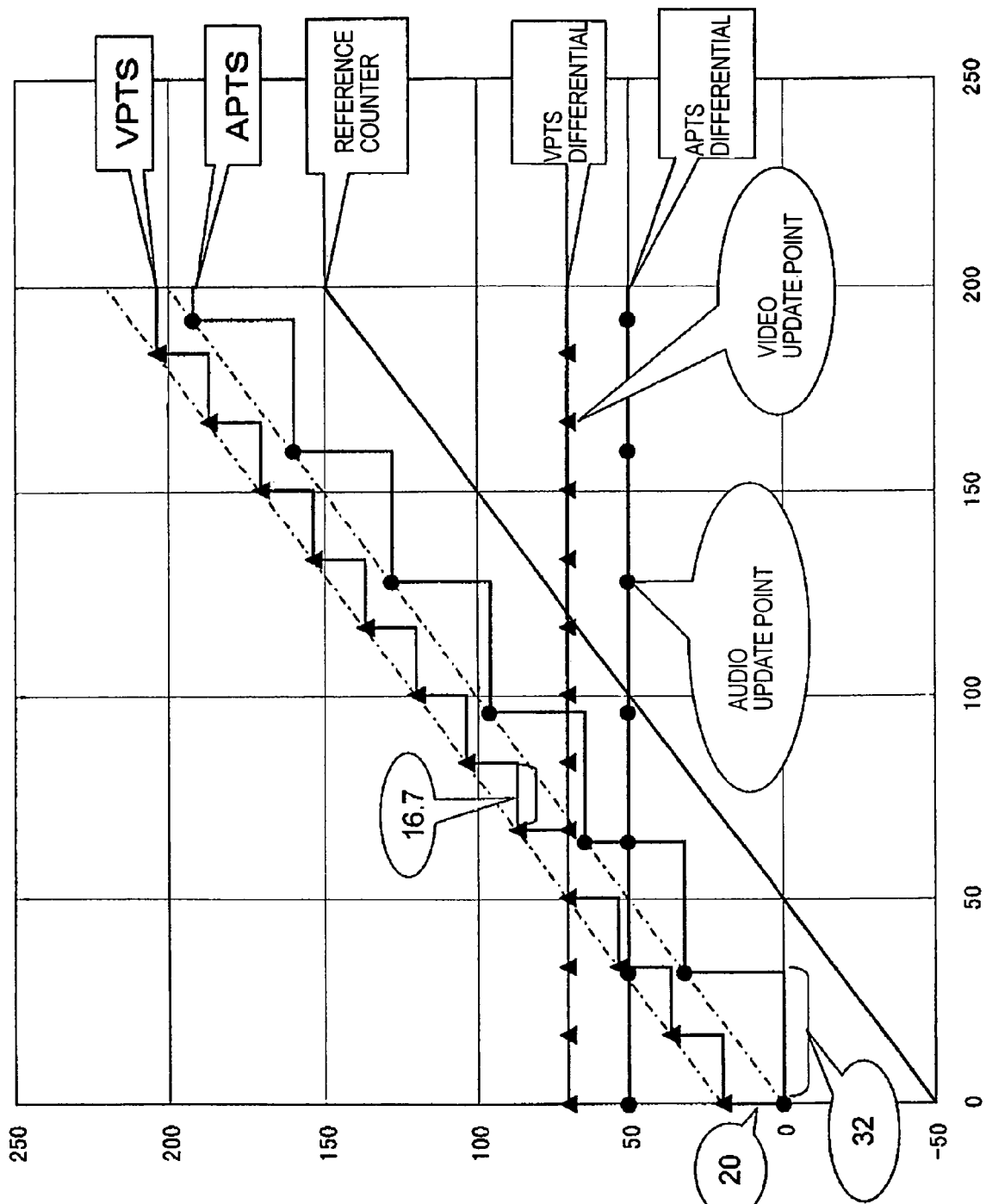
FIG. 9 is a graph showing how the values retained in the VPTS register 56, VPTS differential register 57, APTS register 58 and APTS differential register 59 change.

The meaning of this comparison to be made in Step S85 will be described with reference to FIG. 9, which is a graph showing how the values retained in the VPTS register 56, VPTS differential register 57, APTS register 58 and APTS differential register 59 change. This graph shows an example in which the video is synchronized with the audio and output continuously so as to be 20 ms ahead of the audio.

In this preferred embodiment, the APTS value increases discretely every 32 ms and the VPTS value also increases discretely every 16.7 ms. In FIG. 9, the times at which the APTS values and APTS differential values are updated are indicated by the solid circles ●, while the times at which the VPTS values and VPTS differential values are updated are indicated by the solid triangles ▲. The audio frames and video frames are output at these timings. In this example, the reference counter is supposed to start counting at a point in time of −50 ms at the beginning of the APTS playback for convenience sake. However, the counter initial value at the beginning of playback may be set to any other arbitrary value.

As described above, the APTS register 58 and the VPTS register 56 each hold the previous value until the next value is input thereto. Accordingly, the values held by the APTS register 58 and VPTS register 56 are plotted as steps. That is why the difference between the APTS and VPTS values changes significantly according to the timing to calculate that difference. Consequently, it is not appropriate to check synchronization between the audio and video based on this difference.

The audio frame and video frame are output when the APTS value or VPTS value either matches the reference counter value or has a predetermined difference from it. In the example shown in FIG. 9, the audio and video frames are output when a difference of −50 ms is made. Accordingly, under the condition of this preferred embodiment in which the reference counter value is generated by reference to the presentation time of the audio frame, the differential value between the APTS value and reference counter value (i.e., the APTS differential value) is always calculated constant as plotted by the graph representing the APTS difference.

On the other hand, the differential value between the VPTS value and the reference counter value (i.e., the VPTS differential value) becomes constant unless the output of the video frame is too late or too early. For example, if the video is output in −50 ms to +30 ms with respect to the audio, then the VPTS differential value becomes substantially constant as plotted by the graph representing the VPTS differential value. In that case, the viewer feels that the video is synchronized with the audio. However, if the video frame is output too late to keep the delay within that range, then the VPTS differential value will decrease. Conversely, if the video frame is output too early, then the VPTS differential value will increase.

Accordingly, by comparing the APTS differential value and the VPTS differential value with each other, it is possible to accurately estimate, without depending on the timing to make that comparison, how much the output of the video frame is behind that of the audio frame.

Referring back to FIG. 8, if the VPTS differential value has turned out to be greater than the APTS differential value by a predetermined amount of time α (=30 ms, for example) or more as a result of the comparison made in Step S85, then the process advances to Step S86. Otherwise, the process advances to Step S87.

If the process advances to Step S86, the video frame has been output too early. In that case, the video decoder 60 outputs the current video frame again in accordance with the instruction given by the AV synchronization control section 55. As a result, a pause is set on the output of the video frame to let the output of the audio frame catch up with that of the video frame, thereby synchronizing the audio and video together. After that, the process advances to Step S89.

Meanwhile, in Step S87, it is determined whether or not the VPTS differential value is smaller than the APTS differential value minus a predetermined amount of time β (=50 ms, for example). If the answer is YES, the process advances to Step S88. Otherwise, it means that the VPTS differential value is approximately equal to the APTS differential value. Thereafter, the process advances to Step S89.

In Step S88, in accordance with the instruction given by the AV synchronization control section 55, the video decoder 60 skips one video frame and outputs the following video frames instead. As a result, the output of the video frame catches up with that of the audio frame, thus synchronizing the audio and video together.

Finally, in Step S89, the AV synchronization control section 55 determines whether or not there are any video frames left. If the answer is YES, then Step S83 and following processing steps are performed all over again. Otherwise, the process ends.

Next, it will be described with reference to FIG. 10 what processing is done if the output of the audio frame has finished earlier than that of the video frame.

Figure 10:
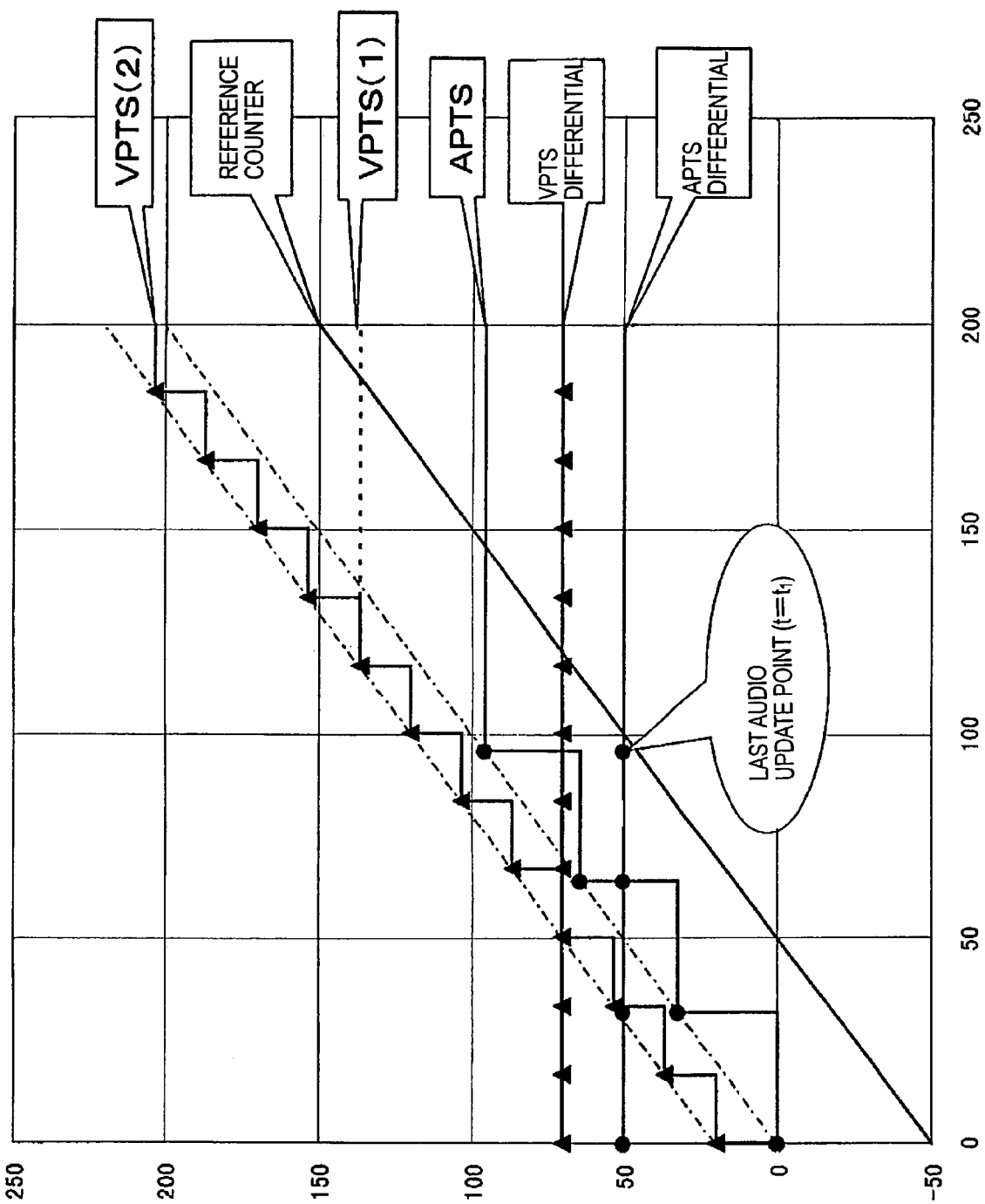
FIG. 10 is a graph showing how the values retained in the registers 56, 57, 58 and 59 will change in a situation where the output of the audio frame has finished earlier than that of the video frame.

FIG. 10 is a graph showing how the values retained in the registers 56, 57, 58 and 59 will change in a situation where the output of the audio frame has finished earlier than that of the video frame. Suppose the output of the audio frame has finished at a time t=t1 and is now discontinued. It should be noted that the value of the APTS register no longer increases after the time t=t1 because the APTS is not updated anymore after that. Accordingly, if one tried to synchronize the video by reference to the value of the APTS register 58, then the output of the video would come to a halt, too, as indicated by the dashed line VPTS(1).

However, if the APTS differential register 57 and the VPTS differential register 59 are used, the same value of the APTS differential register will be output continuously even after the output of the audio data has discontinued. Thus, the same state can be maintained as if the audio were still output continuously. That is why the output of the video frame can be continued just as intended by the same processing as that described above. The values of the VPTS register 56 in such a situation are represented by VPTS(2).

Figure 11:
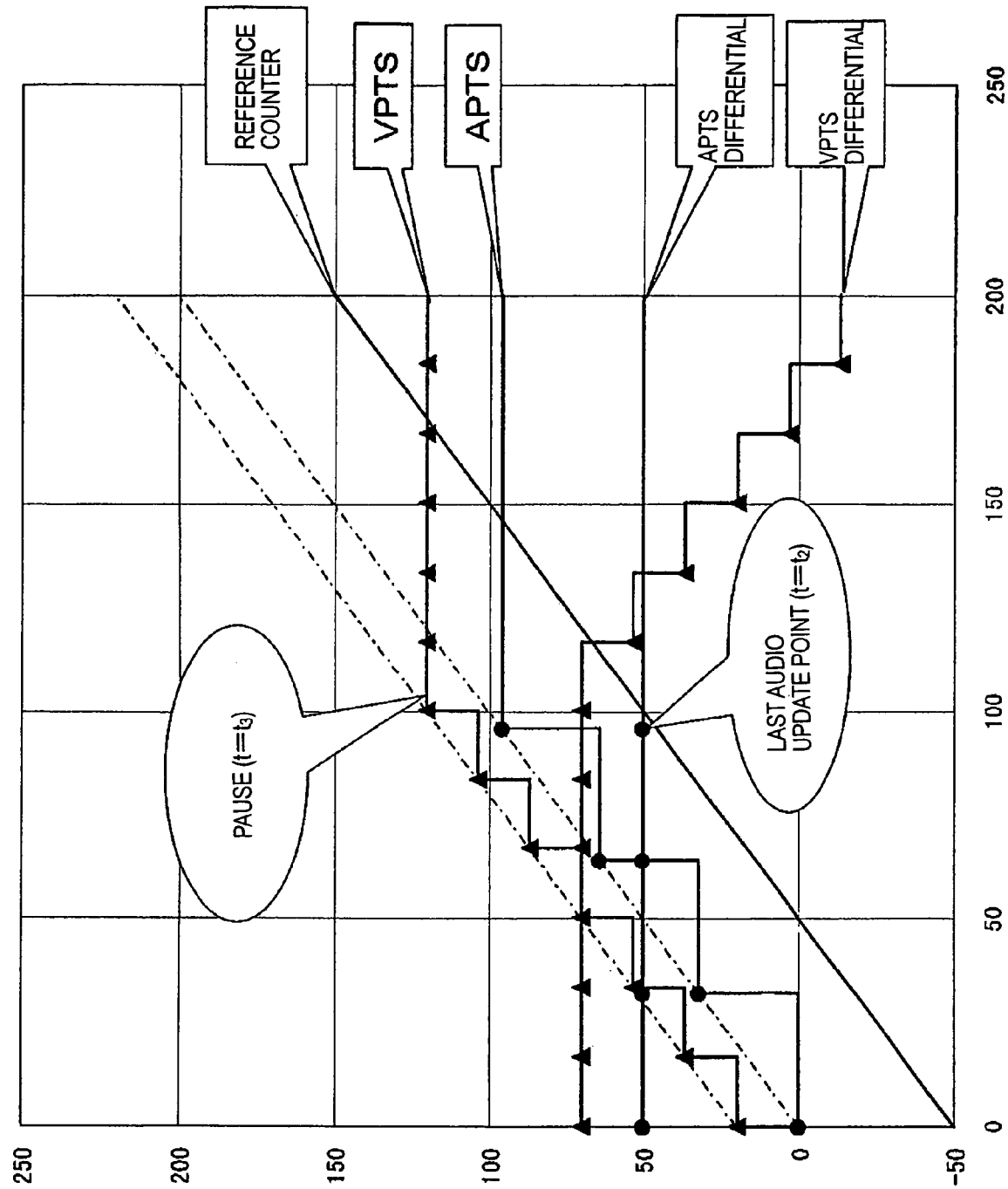
FIG. 11 is a graph showing how the values retained in the registers 56, 57, 58 and 59 will change if a pause has been set on the playback.

Next, it will be described with reference to FIG. 11 what processing should be done if a pause has been set on the playback of audio and video in response to the viewer's command, for example. FIG. 11 is a graph showing how the values retained in the registers 56, 57, 58 and 59 will change if a pause has been set on the playback. Suppose a pause has been put on the playback at a time t=t3. During a pause interval after that time t=t3, the same video frame is output over and over again. Accordingly, the same VPTS value as that output just before the pause was set is continuously input to the VPTS register 56. Also, since the VPTS value is constant and the reference counter value increases, the VPTS differential value input to the VPTS differential register 57 gradually decreases stepwise. Meanwhile, the output of the audio stops. Thus, the APTS value and the APTS differential value remain those updated at the time t=t2, which is just before the time t=t3 when the pause was put. Comparing the APTS differential value and the VPTS differential value with each other, their difference goes on increasing during the pause interval. As a result, although the playback is actually carried on normally, the AV synchronization control section 55 erroneously senses a delay in the playback of the video frame, thus causing a malfunction.

Thus, in this case, the AV synchronization control section 55 may continue to output the video frame by using the APTS value held in the APTS register 58 and the VPTS value held in the VPTS register 56. That is to say, the APTS value held in the APTS register 58 and the VPTS value held in the VPTS register 56 keep quite the same values, and their difference is also constant during the pause interval. That is why by reference to this difference, the AV synchronization control section 55 never senses a lag in the playback timing of the video frame. According to the NTSC standard, the video frame is output every 1/29.97 second (i.e., about 1/30 second) with respect to the frame that was presented just before the pause setting time t=t3. It should be noted that if the video frame is presented by the interlacing technique, each of the previous two fields is output every 1/59.94 second (i.e., about 1/60 second). In setting these timings, no APTS values in the APTS register 58 are used in particular.

Figure 12:
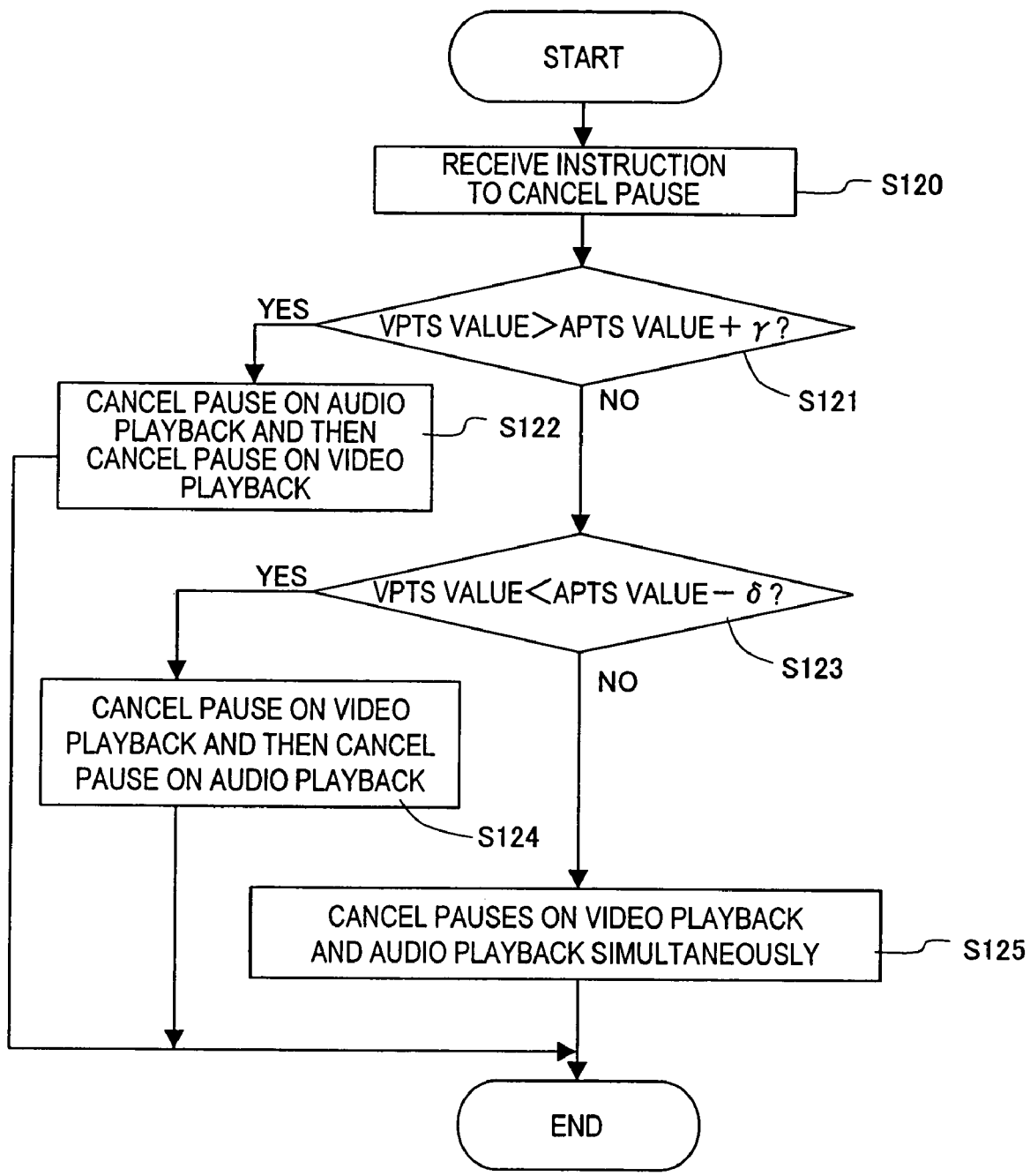
FIG. 12 is a flowchart showing the procedure of processing done by the data processor 50 when the playback pause is cancelled.

When the pause is cancelled after that, the data processor 50 can synchronize the audio and video together by performing the processing steps shown in FIG. 12, which shows the procedure of processing to be done by the data processor 50 when the playback pause is cancelled. First, in Step S120, the AV synchronization control section 55 receives an instruction to cancel the pause from the viewer, for example. Next, if the VPTS value is found greater than the sum of the APTS value and a predetermined amount of time γ (=30 ms, for example) in Step S121, then the process advances to Step S122. Otherwise, the process advances to Step S123. In Step S122, the AV synchronization control section 55 cancels the pause on the audio playback and then cancels the pause on the video playback. By removing the pause on the audio playback first, the output of the audio frame catches up with that of the video frame and the audio and video can be synchronized with each other. Then, the process shown in FIG. 12 ends and advances to the remaining process shown in FIG. 8.

In Step S123, it is determined whether or not the VPTS value is smaller than the APTS value minus a predetermined amount of time δ (=50 ms, for example). If the answer is YES, the process advances to Step S124. Otherwise, the process advances to Step S125.

In Step S124, the AV synchronization control section 55 cancels the pause on the video playback and then cancels the pause on the audio playback. As a result, the output of the video frame catches up with that of the audio frame and the audio and video can be synchronized with each other. Then, the process shown in FIG. 12 ends and advances to the remaining process shown in FIG. 8.

In Step S125, the pause on the video playback and the pause on the audio playback are cancelled at the same time. Then, the process shown in FIG. 12 ends and advances to the remaining process shown in FIG. 8. Optionally, the audio and video may also be synchronized with each other by comparing the sum of the values held in the VPTS differential register and reference counter register with that held in the APTS register.

It is difficult to identify the currently output frame just with the VPTS differential register 57 and the reference counter register 54. However, by providing the VPTS register 56, the video frame being output can be identified easily.

Figure 13:
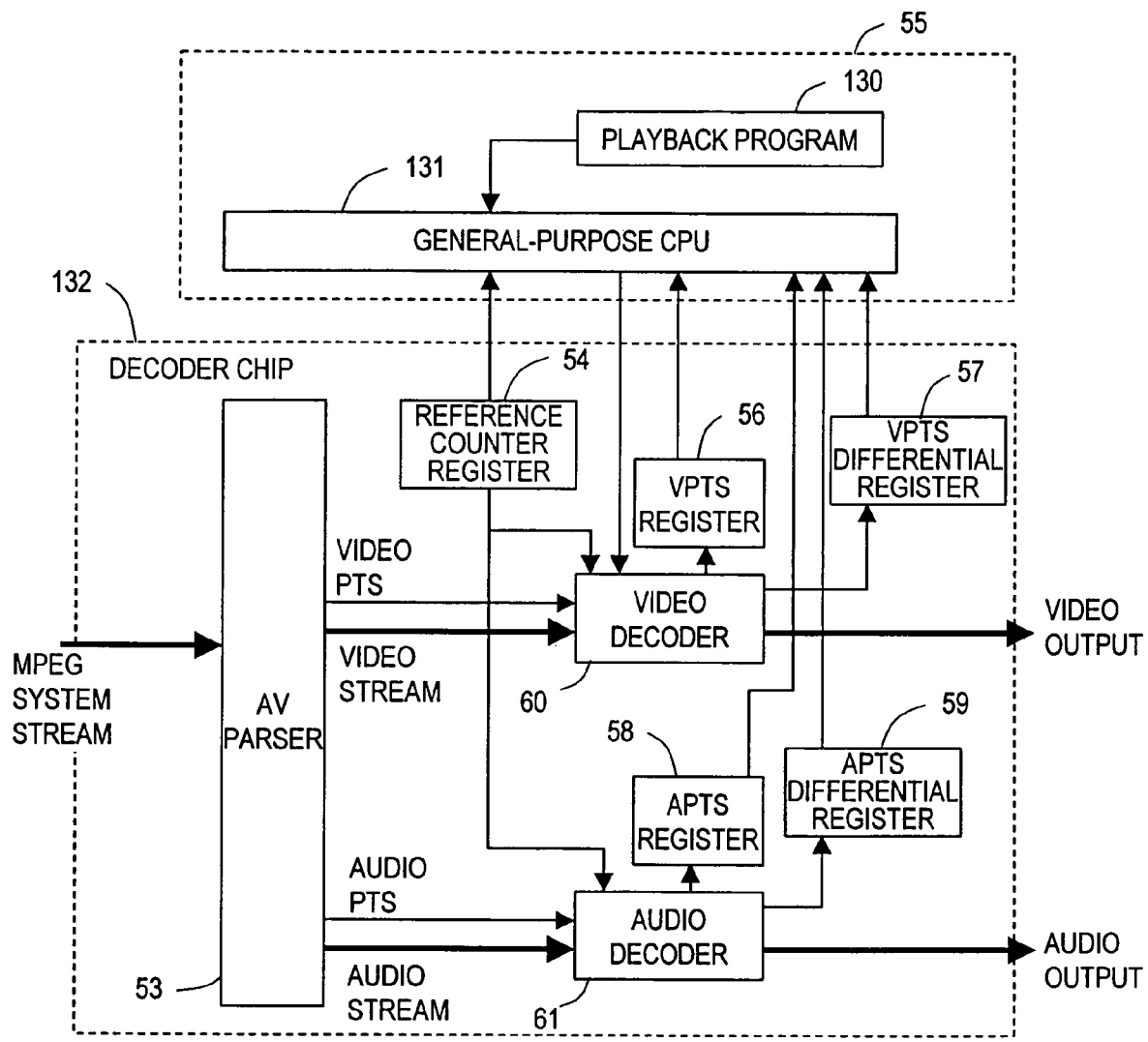
FIG. 13 is a block diagram showing an alternative configuration for the data processor.

A data processor 50 according to a preferred embodiment of the present invention works as described above. However, the data processor 50 may also have a configuration such as that shown in FIG. 13, not just the configuration shown in FIG. 5. FIG. 13 shows an alternative configuration for the data processor. In this example, the function of the AV synchronization control section 55 is carried out by a general-purpose CPU 131 that operates following a playback processing program 130, and all components of the data processor but the optical pickup 51, playback processing section 52 and AV synchronization control section 55 are implemented as a single decoder chip 131. The illustration of the optical pickup 51 and the playback processing section 52 is omitted.

The playback processing program 130 is described so as to make the data processor operate following the procedures shown in FIGS. 8 and 12 and is executed by the general-purpose CPU 131. If the CPU performs the function of the AV synchronization control section 55 by executing a software program, then the real-time requirement on the processing of the AV synchronization control section 55 can be relaxed. More specifically, the general-purpose CPU 131 needs to perform not only the processing described above but also other types of processing, including moving the optical pickup 51 and digitization processing at the playback processing section 52, as well. The processes shown in FIGS. 8 and 12 are not limited to any particular timing to compare the VPTS differential value and the APTS differential value but can achieve accurate synchronization whenever performed. Thus, there are fewer scheduling limits on the operation of the general-purposed CPU 131. This advantage is significant considering that the general-purpose CPU 131 of the conventional player 20 should update the PTS at a strict timing in order to improve the precision of synchronization.

INDUSTRIAL APPLICABILITY

According the present invention, audio and video can be synchronized together just as intended by comparing the progress of the audio and video outputs with each other using an APTS differential register and a VPTS differential register. In addition, even if the audio data has discontinued earlier than the video data, the video can still be output continuously by reference to the audio. Furthermore, by providing an APTS register, the progress of the audio and video outputs can also be compared even during a pause interval and the audio and video can be synchronized with each other after the pause has been cancelled. As a result, a player that can carry out playback without making the viewer feel uncomfortable can be provided.

The invention claimed is:

1. A data processor comprising:
   a parser, which receives a data stream and which separates, from the data stream, video data including data of a plurality of pictures, a first time information value showing a presentation time of each of those pictures, audio data including data of a plurality of audio frames, and a second time information value showing a presentation time of each of those audio frames;

an output section for outputting the video data and the audio data to play back the pictures and the audio frames;

a reference register for counting amount of time that has passed since a predetermined reference time;

a first differential register for calculating a difference between the first time information value of each said picture and the amount of time passed and holding the difference as a first differential value when the picture is output;

a second differential register for calculating a difference between the second time information value of each said audio frame and the amount of time passed and holding the difference as a second differential value when the audio frame is output; and a control section for controlling output of the video data according to the magnitude of the first differential value with respect to that of the second differential value.

2. The data processor of claim 1, wherein the reference register counts the amount of time passed by setting a time when the audio data starts to be output as the predetermined reference time.

3. The data processor of claim 1, wherein when finding the first differential value greater than a sum of the second differential value and a first prescribed value, the control section instructs the output section to output the video data of the picture being output at that point in time again.

4. The data processor of claim 1, wherein when finding the first differential value smaller than the difference between the second differential value and a second prescribed value, the control section instructs the output section to skip output of the video data of the picture.

5. The data processor of claim 1, wherein on receiving an instruction to set a pause on playback, the control section controls the output of the video data by reference to the first and second time information values.

6. The data processor of claim 5, wherein on receiving an instruction to cancel the pause on playback, the control section instructs the output section to output the audio data earlier than the video data if the first time information value is greater than a sum of the second time information value and a third prescribed value.

7. The data processor of claim 5, wherein on receiving an instruction to cancel the pause on playback, the control section instructs the output section to output the video data earlier than the audio data if the first time information value is smaller than the difference between the second time information value and a fourth prescribed value.

8. The data processor of claim 5, wherein on receiving an instruction to cancel the pause on playback, the control section instructs the output section to output the video data and the audio data simultaneously.

9. A data processing method comprising the steps of:
receiving a data stream;
separating, from the data stream, video data including data of a plurality of pictures, a first time information value showing a presentation time of each of those pictures, audio data including data of a plurality of audio frames, and a second time information value showing a presentation time of each of those audio frames;
outputting the video data and the audio data to play back the pictures and the audio frames;
counting amount of time that has passed since a predetermined reference time;
calculating a difference between the first time information value of each said picture and the amount of time passed and holding the difference as a first differential value when the picture is output;

calculating a difference between the second time information value of each said audio frame and the amount of time passed and holding the difference as a second differential value when the audio frame is output; and
controlling output of the video data according to the magnitude of the first differential value with respect to that of the second differential value.

10. The data processing method of claim 9, wherein the step of counting includes counting the amount of time passed by setting a time when the audio data starts to be output as the predetermined reference time.

11. The data processing method of claim 9, wherein if the first differential value is greater than a sum of the second differential value and a first prescribed value, the step of outputting includes outputting the video data of the picture being output at that point in time again.

12. The data processing method of claim 9, wherein if the first differential value is smaller than the difference between the second differential value and a second prescribed value, the step of outputting includes skipping output of the video data of the picture.

13. The data processing method of claim 9, further comprising the step of receiving an instruction about a pause on playback,
wherein the step of outputting includes controlling the output of the video data by reference to the first and second time information values in accordance with the instruction.

14. The data processing method of claim 13, further comprising the step of receiving an instruction to cancel the pause on playback,
wherein the step of outputting includes outputting the audio data earlier than the video data in accordance with the instruction if the first time information value is greater than a sum of the second time information value and a third prescribed value.

15. The data processing method of claim 13, further comprising the step of receiving an instruction to cancel the pause on playback,
wherein the step of outputting includes outputting the video data earlier than the audio data in accordance with the instruction if the first time information value is smaller than the difference between the second time information value and a fourth prescribed value.

16. The data processing method of claim 13, further comprising the step of receiving an instruction to cancel the pause on playback,
wherein the step of outputting includes outputting the video data and the audio data simultaneously in accordance with the instruction.

17. A product, comprising:
a data processor, wherein the data processor includes a computer executing a computer program to receive a data stream; separate, from the data stream, video data including data of a plurality of pictures, a first time information value showing a presentation time of each of those pictures, audio data including data of a plurality of audio frames, and a second time information value showing a presentation time of each of those audio frames; output the video data and the audio data to play back the pictures and the audio frames; count an amount of time that has passed since a predetermined reference time; calculate a difference between the first time information value of each said picture and the amount of time passed and holding the difference as a first differential value when the picture is output; calculate a difference between the second time information value of each said audio frame and the amount of time passed and holding the difference as a second differential value when the audio frame is output; and control an output of the video data according to the magnitude of the first differential value with respect to that of the second differential value.

18. The product of claim 17, wherein the step of counting includes counting the amount of time passed by setting a time when the audio data starts to be output as the predetermined reference time.

19. The product of claim 17, wherein if the first differential value is greater than a sum of the second differential value and a first prescribed value, the step of outputting includes outputting the video data of the picture being output at that point in time again.

20. The product of claim 17, wherein if the first differential value is smaller than the difference between the second differential value and a second prescribed value, the step of outputting includes skipping output of the video data of the picture.

* * * * *